United States Patent
Loacker

(10) Patent No.: US 11,296,382 B2
(45) Date of Patent: Apr. 5, 2022

(54) BATTERY PACK

(71) Applicant: DESIGNWERK PRODUCTS AG, Winterthur (CH)

(72) Inventor: Frank Loacker, Pfungen (CH)

(73) Assignee: DESIGNWERK PRODUCTS AG, Winterthur (CH)

( * ) Notice: Subject to any disclaimer, the term of this patent is extended or adjusted under 35 U.S.C. 154(b) by 23 days.

(21) Appl. No.: 16/544,222

(22) Filed: Aug. 19, 2019

(65) Prior Publication Data

US 2021/0057696 A1 Feb. 25, 2021

(51) Int. Cl.

| | |
|---|---|
| *H01M 2/10* | (2006.01) |
| *H01M 10/613* | (2014.01) |
| *H01M 10/615* | (2014.01) |
| *H01M 10/625* | (2014.01) |
| *H01M 10/6554* | (2014.01) |

(Continued)

(52) U.S. Cl.
CPC ......... *H01M 50/20* (2021.01); *H01M 10/613* (2015.04); *H01M 10/615* (2015.04); *H01M 10/625* (2015.04); *H01M 10/6554* (2015.04); *H01M 10/6567* (2015.04); *H01M 10/653* (2015.04); *H01M 10/6556* (2015.04); *H01M 50/24* (2021.01); *H01M 2220/20* (2013.01); *Y02E 60/10* (2013.01)

(58) Field of Classification Search
CPC ............. H01M 2/1083; H01M 10/613; H01M 10/615; H01M 10/625; H01M 10/6554; H01M 10/6567; H01M 2/1077; H01M 2220/20; H01M 10/653; H01M 10/6556; H01M 50/20; H01M 50/24; Y02E 60/10
See application file for complete search history.

(56) References Cited

U.S. PATENT DOCUMENTS

2011/0155485 A1* 6/2011 Tsurumi ............... H01M 10/425 180/65.1
2011/0159341 A1* 6/2011 Iwamoto ............. H01M 10/659 429/120

(Continued)

FOREIGN PATENT DOCUMENTS

| | | |
|---|---|---|
| CN | 107284211 A | 10/2017 |
| CN | 207368041 U | 5/2018 |

(Continued)

OTHER PUBLICATIONS

Co-pending U.S. Appl. No. 16/543,100, Loacker et al., "Power Supply," filed Aug. 16, 2019.

(Continued)

*Primary Examiner* — Lingwen R Zeng
(74) *Attorney, Agent, or Firm* — Pauley Erickson & Swanson

(57) ABSTRACT

A battery pack for an electric truck includes a box shaped outer housing, a stack of battery modules accommodated inside the outer housing comprising at least one thermal plate and several battery modules arranged in thermal contact with the at least one thermal plate for heating and/or cooling of the at least one battery module and at least one support element being arranged at least partially between the stack of battery modules and the outer housing including at least partially a porous material and supporting the battery stack with respect to the outer housing.

19 Claims, 3 Drawing Sheets

(51) Int. Cl.
*H01M 10/6567* (2014.01)
*H01M 50/20* (2021.01)
*H01M 10/653* (2014.01)
*H01M 10/6556* (2014.01)
*H01M 50/24* (2021.01)

(56) References Cited

U.S. PATENT DOCUMENTS

2013/0207459 A1* 8/2013 Schroder ............ H01M 10/613
307/10.1
2016/0049706 A1 2/2016 Kerspe et al.
2016/0072163 A1* 3/2016 Tsuruta ............... H01M 10/658
429/156

FOREIGN PATENT DOCUMENTS

| CN | 109677253 A | 4/2019 |
| CN | 208812975 U | 5/2019 |
| CN | 208881608 U | 5/2019 |
| CN | 109955704 A | 7/2019 |
| DE | 10 2017 214 023 A1 | 2/2019 |
| EP | 3 327 821 A1 | 5/2018 |
| WO | WO 2017/137121 A1 | 8/2017 |
| WO | WO 2018/230390 A1 | 12/2018 |

OTHER PUBLICATIONS

Co-pending U.S. Appl. No. 16/586,399, Loacker, "Electric Truck," filed Sep. 27, 2019.
Co-pending U.S. Appl. No. 16/545,960, Loacker, "Drivetrain," filed Aug. 20, 2019.

* cited by examiner

BATTERY PACK

BACKGROUND OF THE INVENTION

Field of the Invention

The present invention relates to a battery pack for electric trucks.

Discussion of Related Art

DE102017214023A1 published on 14 Feb. 2019 in the name of Audi AG discloses a battery comprising a stack of battery cells comprising several battery cells arranged one above the other. For heat dissipation, the battery cells are each thermally coupled by means of at least one heat conductor to a heat distributor which is arranged on the end face of the battery cell stack and is thermally coupled to a heat sink on its side remote from the battery cell stack.

EP3327821A1 published on 30 May 2018 in the name of LG Chemical Ltd. discloses a battery module assembly including: a module array body including two or more unit modules, each including a plurality of battery cells, the unit modules being arranged while sides thereof are closely attached to each other; and a combination-type module housing that includes a first space set by combining a plurality of plate members, and a second space set in the first space while a fixing bracket is additionally combined to one of the plurality of plate members. Further, a lower plate is a terminal conductive metallic plate of which the inside is formed with a hollow structure so that a liquid coolant can flow therethrough.

SUMMARY OF THE INVENTION

It is an object of the disclosure to improve the state of the art in the field of battery packs for electric trucks.

A preferred variation the disclosure is directed to a battery pack for an electric vehicle, in particular an electric truck, comprising a box-shaped outer housing comprising a base, a top and at least one side extending between the base and the top. If appropriate the outer housing may be cuboid-shaped. The base, the top and the at least one side may be preferably made from sheet metal in order to form light, rigid and robust walls of the outer housing.

The outer housing preferably forms an environmentally sealed compartment to provide a protection against environmental conditions of the inside. The outer housing may be of a multipart design allowing to detach preferably the top and/or the base for easy access to the inside. Sealing means may be arranged at the closing edges of the detachable walls of the outer housing in order to form the environmentally sealed compartment. Furthermore, the outer housing may act as a carrying structure for the battery pack. For this and other reasons, the outer housing can comprise fastening means to mechanically interconnect the battery pack to a chassis of an electric truck. The fastening means may comprise a quick release coupling. In addition, or alternatively the fastening means may comprise a horn-shaped hanger.

Inside the outer housing a stack of battery modules is accommodated comprising at least one thermal plate and several battery modules arranged in thermal contact with the at least one thermal plate for heating and/or cooling of the at least one battery module. The battery modules and the at least one thermal plate of the stack of battery modules are preferably stacked vertically upward forming at least one battery stack layer. The outer housing may comprise an electrical interface to electrically interconnect the battery modules to an electric drive train of the electric truck. At least one support element is arranged at least partially between the stack of battery modules and the outer housing comprising at least partially of a porous material. Using a porous material is advantageous, as these materials are lightweight. The at least one support element supports the stack of battery modules with respect to the outer housing. The support element preferably spaces the stack of battery modules apart from the outer housing.

Preferably the battery modules are supported with respect to each other by an inner housing. The inner housing can provide structural stability to the stack of battery modules. The inner housing preferably surrounds the stack of battery modules at least partially. At least one thermal plate preferably forms part of the inner housing. Good results can be obtained when at least two thermal plates are arranged parallel to each other and are mechanically interconnected to each other by at least one spacer. On top of each of the at least two thermal plates battery modules are arranged each thermally coupled to at least on thermal plate. The at least one spacer can be formed as a bend sheet material and/or as a pillar. Usually metal is used for the spacer, but other materials such as composite fiber materials or plastics are conceivable as well.

The stack of battery modules can be supported with respect to the outer housing by the inner housing and the at least one support element. The inner housing is preferably box-shaped and the stack of battery modules is preferably supported with respect to the outer housing by plate-shaped support elements. Good results can be achieved when the plate-shaped support elements form a box-shaped support structure. If appropriate the box-shaped support structure of plate-shaped support elements surrounds and/or encompasses the stack of battery modules and/or the inner housing. The box-shaped support structure may comprise at least one load bearing surface facing the inner housing and/or the outer housing. The inner housing may in portions lie against the at least one load bearing surface of the box-shaped support structure. This is advantageous as potential forces on the box-shaped support structure from the inner housing and/or outer housing can be distributed over a surface and thereby reducing the force per area when increasing the (contact) surface between the box-shaped support structure and the inner housing and/or outer housing. At least one cut-out section in the box-shaped support structure may provide access from the electrical interface to the battery modules.

Usually the porous material of the at least one support element has a lower thermal conductivity than the material of the at least one thermal plate and/or the material of the outer housing. This allows the support element to act as a thermal insulator between the battery modules and the outer housing. The support element may comprise at least one layer, wherein the layers can be of varying density and thickness. Preferably the support element is at least partially made from foam, however other material such as honey comb or plastic materials are also possible. If appropriate the selected foam is elastic. The support element may comprise a shock absorbing and/or vibration damping layer. This is advantageous as the stack of battery modules is protected/isolated from vibrations from the chassis of the truck transmitted to the outer housing of the battery pack.

In general, the at least one thermal plate comprises at least one fluid channel for a thermal exchange fluid to flow through. The fluid channel may be interconnected to a thermal exchange fluid interface accessible from the outside of the outer housing. The at least one thermal plate may be constructed from multiple connected layers. The fluid channel may be formed by a cut-out section of a middle layer of the thermal plate. The thermal exchange fluid interface is usually arranged in an outer wall of the outer housing; however other positions are also possible depending on the application. This provides a possibility to connect the at least one fluid channel of the thermal plate to an external thermal exchange fluid circuit via the thermal exchange fluid interface. The thermal exchange fluid interface being preferably arranged adjacent to the electric interface. Usually the thermal exchange fluid interface and the electric interface are with respect to a forward driving direction of the electric truck arranged at a leading face of the outer housing. This way the two interfaces are arranged close to the drivetrain of the electric truck which reduces the amount of cable and/or pipes needed to connect the battery pack to the electric drive of the electric truck.

Another preferred variation the disclosure is directed to an electric truck comprising fastening means to mechanically interconnect the battery pack according to at least one of the preceding claims to the chassis of an electric truck. The fastening means are preferably arranged at two cantilevers. The two cantilevers being arranged at the chassis of the electric truck spaced a distance apart from each other suitable to receive the batter pack therebetween. The fastening means of the truck may interact with the associated fastening means of the battery pack to mechanically interconnect and/or detachably interconnect the battery pack to a chassis of an electric truck.

Furthermore, the electrical truck may comprise an electrical interface to electrically interconnect the battery pack to an electric drive train of the electric truck. The electric truck may additionally comprise a thermal exchange fluid circuit to which the fluid channel of the at least on thermal plate of the battery pack can be connected via the thermal exchange fluid interface of the battery pack.

The disclosure may additionally be described by the following clauses:

Clause 1: A battery pack for an electric truck comprising:
  a. a box shaped outer housing comprising a base, a top and at least one side extending between the base and the top;
  b. wherein the outer housing comprises
    i. fastening means to mechanically interconnect the battery pack to a chassis of an electric truck;
    ii. an electrical interface to electrically interconnect the battery modules to an electric drive train of the electric truck;
  c. a stack of battery modules accommodated inside the outer housing comprising at least one thermal plate and several battery modules arranged in thermal contact with the at least one thermal plate for heating and/or cooling of the at least one battery module; and
  d. at least one support element being arranged at least partially between the stack of battery modules and the outer housing comprising at least partially of a porous material and supporting the battery stack with respect to the outer housing.

Clause 2: The battery pack according to clause 1, wherein the battery modules are supported with respect to each other by an inner housing.

Clause 3: The battery pack according to clause 2, wherein the at least one thermal plate forms part of the inner housing.

Clause 4: The battery pack according to at least one of the previous clauses, wherein at least two thermal plates are arranged parallel to each other and are mechanically interconnected to each other by at least one spacer.

Clause 5: The battery pack according to at least one of the clauses 2 to 4, wherein the stack of battery modules is supported with respect to the outer housing by the inner housing and the at least one support element.

Clause 6: The battery pack according to at least one of the previous clauses, wherein the inner housing is box-shaped and supported with respect to the outer housing by plate-shaped support elements.

Clause 7: The battery pack according to clause 6, wherein the plate-shaped support elements form a box-shaped support structure.

Clause 8: The battery pack according to at least one of the previous clauses, wherein the fastening means comprise a quick release coupling.

Clause 9: The battery pack according to at least one of the previous clauses, wherein the fastening means comprise a horn-shaped hanger.

Clause 10: The battery pack according to at least one of the previous clauses, wherein the porous material of the at least one support element has a lower thermal conductivity then the material of the at least one thermal plate and/or the material of the outer housing.

Clause 11: The battery pack according to at least one of the previous clauses, wherein the support element is at least partially made from foam.

Clause 12: The battery pack according to clause 11, wherein the support element comprises a shock absorbing and/or vibration damping layer.

Clause 13: The battery according to at least one of the previous clauses, wherein the at least one thermal plate comprises at least one fluid channel for a thermal exchange fluid to flow through, said fluid channel being interconnected to a thermal exchange fluid interface accessible from the outside of the outer housing.

Clause 14: The battery pack according to clause 13, wherein the thermal exchange fluid interface is arranged in an outer wall of the outer housing.

Clause 15: The battery pack according to clause 13 or 14, wherein the thermal exchange fluid interface is arranged adjacent to the electric interface.

Clause 16: The battery pack according to clause 13, wherein the thermal exchange fluid interface and the electric interface are with respect to a driving direction of the electric truck arranged at a leading face of the outer housing.

Clause 17: The battery pack according to one of the previous clauses, wherein the outer housing forms an environmentally sealed compartment.

Clause 18: The battery pack according to one of the previous clauses, wherein the battery modules and the at least one thermal plate of the stack of battery modules are stacked vertically upward forming at least one battery stack layer.

Clause 19: Electric truck comprising fastening means to mechanically interconnect the battery pack according to at least one of the preceding clauses to the chassis of an electric truck.

Clause 20: The electric truck according to clause 19, wherein the fastening means are arranged at two cantilevers arranged at the chassis of the electric truck spaced a distance apart from each other suitable to receive the batter pack there between.

Clause 21: The electric truck according to clause 19 or 20, wherein the electrical truck comprises an electrical interface to electrically interconnect the battery pack to an electric drive train of the electric truck.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims.

The drawings are showing.

DESCRIPTION OF PREFERRED EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
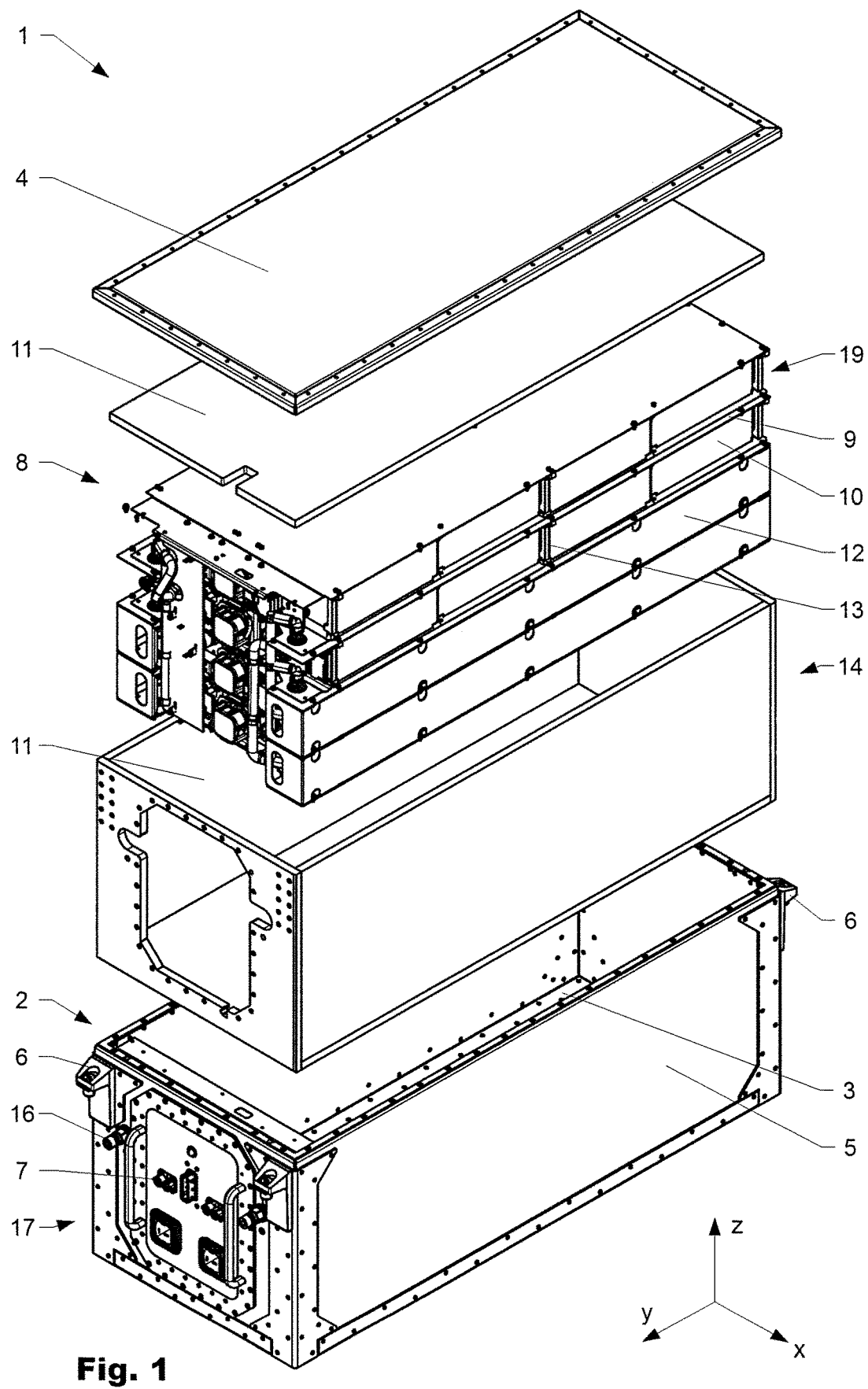
FIG. 1 an exploded view of a battery pack according to the disclosure.
Figure 2:
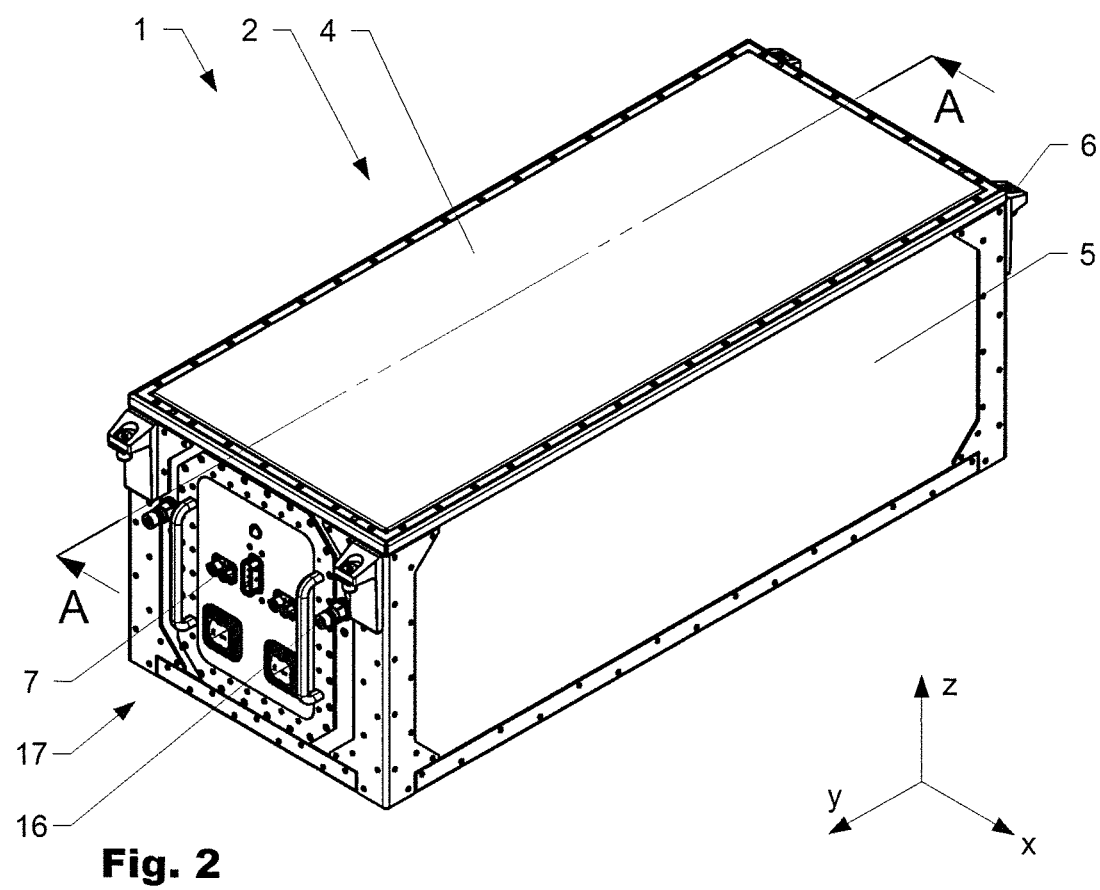
FIG. 2 the assembled battery pack of FIG. 1 in a perspective view.

FIG. 1 and FIG. 2 show a variation of the disclosure directed to a battery pack 1 for an electric truck (not shown) comprising a box-shaped outer housing 2 comprising a base, a top 4 and at least one side 5 extending between the base and the top 4. The outer housing is cuboid-shaped and comprises four sides 5. The base, the top 4 and the sides 5 are made from sheet metal in order to form light, rigid and robust walls of the outer housing 2.

Figure 3:
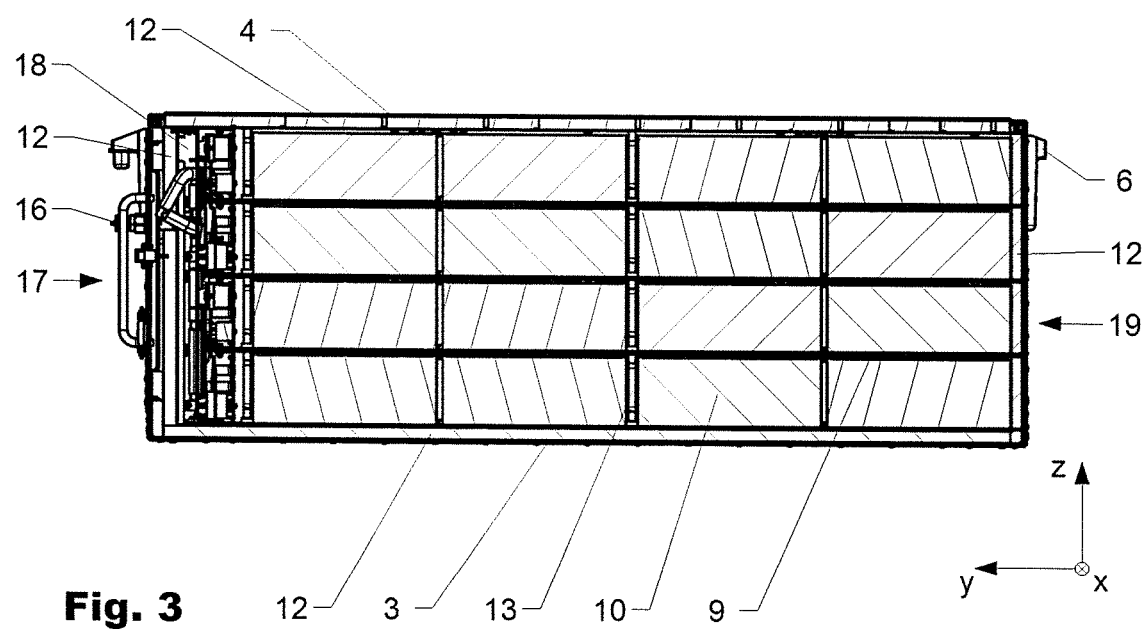
FIG. 3 a cross-sectional view of the battery pack of FIG. 2 indicated by line A in FIG. 2.

In FIG. 3 an environmentally sealed compartment 18 is shown formed by the closed outer housing 2 to provide a protection against environmental conditions. The top 4 is detachable from the rest of the outer housing 2, which also acts as a carrying structure for the battery pack 1. For this and other reasons, the outer housing 2 comprises fastening means 6 to mechanically interconnect the battery pack 1 to a chassis of an electric truck (not shown). The fastening means 6 may comprise a quick release coupling formed by at least one horn-shaped hanger 6. Two horn-shaped hangers 6 are arranged on the leading and trailing face of the outer housing 2 with respect to a driving direction of the electric truck.

Figure 4:
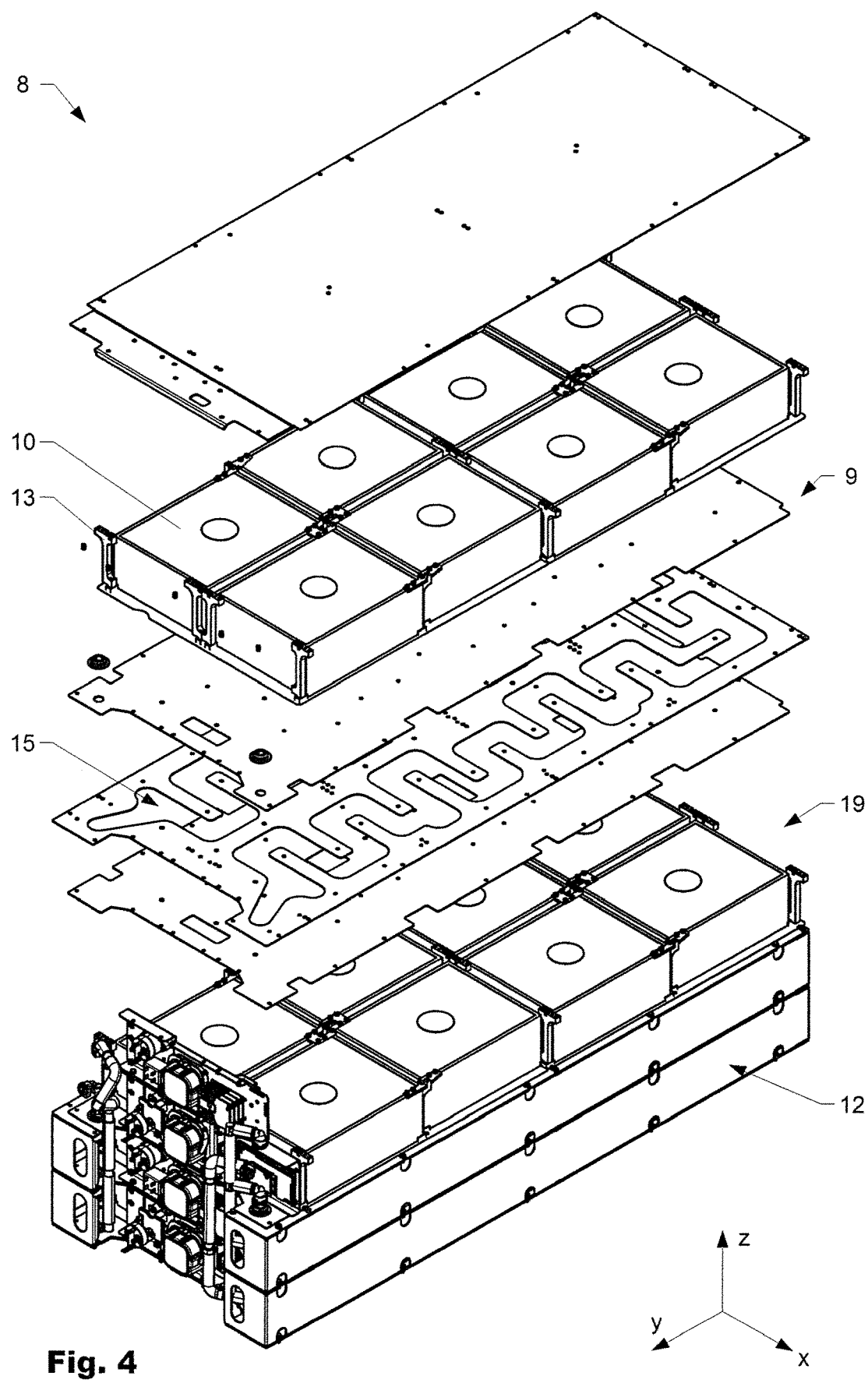
FIG. 4 an exploded view of the stack of battery modules of FIG. 1.

FIG. 3 further shows a stack of battery modules 8 accommodated inside the environmentally sealed compartment 18 of the outer housing 2. FIG. 4 shows the stack of battery modules 8 in an exploded view comprising at least one thermal plate 9 and several battery modules 10 arranged in thermal contact with the at least one thermal plate 9 for heating and/or cooling of at least one battery module 10. The battery modules 10 and thermal plates 9 of the stack of battery modules 8 are stacked vertically upward forming at least one battery stack layer 19. The outer housing 2 comprises an electrical interface 7 to electrically interconnect the battery modules 10 to an electric drive train of the electric truck. The electrical interface 7 shown in FIG. 1 and FIG. 2 comprises electrical connector halves 7 arranged on an outer wall 17 of the outer housing 2.

The battery modules 10 are supported with respect to each other by an inner housing 12 as shown in FIG. 1 and FIG. 4. The inner housing provides structural stability to the stack of battery modules and comprises at least one thermal plate 9 forming part of the inner housing 12 as can be seen from FIGS. 1, 3 and 4. Good results can be obtained when the thermal plates 9 are arranged parallel to each other and are mechanically interconnected to each other by spacers 13. The spacers 13 are metal pillars located between the battery modules 10 and each connect two thermal plates 9.

In FIG. 1 a support element 11 is shown which is arranged between the stack of battery modules 8 and the outer housing 2, wherein the support element 11 comprises at least partially of a porous material. The stack of battery modules 8 is supported with respect to the outer housing 2 by the inner housing 12 and the at least one support element 11. The inner housing 12 is box-shaped and the stack of battery modules 8 is supported with respect to the outer housing by plate-shaped support elements 11 forming a box-shaped support structure 14. This is achieved by the box-shaped support structure 14 of plate-shaped support elements 11 surrounding and/or encompassing the stack of battery modules 8 and/or the inner housing 12. The inner housing 12 is flush with the box-shaped support structure 14 and at least one cut-out section in the box-shaped support structure 14 provides a passage from the electrical interface 7 to the battery modules 10.

The porous material of the at least one support element 11 shown in FIG. 1 and FIG. 3 has a lower thermal conductivity then the material of the at least one thermal plate 9 and/or the material of the outer housing 2. This allows the box-shaped support structure 14 to act as a thermal insulator between the battery modules 10 and the outer housing 2. The support elements 11 are made from an elastic foam in order to act as a shock absorbing and/or vibration damping layer between the inner and outer housing 12, 2. This is advantageous as the stack of battery modules 8 is protected and isolated from vibrations from the chassis of the truck transmitted to the outer housing 2 of the battery pack.

In order to provide an efficient thermal regulation of the battery modules 10, the thermal plates 9 each comprise at least one fluid channel 15 for a thermal exchange fluid to flow through. This is visible in the exploded view of the stack of battery modules 8 in FIG. 4, showing a three-layered thermal plate 9. The middle layer of the disassembled thermal plate 9 comprises a cut-out to form the fluid channel 15. The layers of the thermal plate 9 are made from metal and are welded together. The fluid channel 15 is interconnected to a thermal exchange fluid interface 16 accessible from the outside of the outer housing 2 and the thermal exchange fluid interface 16 is arranged in an outer wall 17 of the outer housing 2 next to the electric interface 7. This provides a possibility to connect the at least one fluid channel 15 of the at least one thermal plate 9 to an external thermal exchange fluid circuit via the thermal exchange fluid interface 16. Usually the thermal exchange fluid interface 16 and the electric interface 7 are with respect to a driving direction of the electric truck arranged at a leading face 17 of the outer housing 2. Rather, the words used in the specification are words of description rather than limitation, and it is understood that various changes may be made without departing from the scope of the invention.

LIST OF DESIGNATIONS

1 Battery pack
2 Outer housing
3 Base
4 Top
5 Side
6 Fastening means
7 Electrical interface
8 Stack of battery modules
9 Thermal plate
10 Battery module
11 Support element
12 Inner housing
13 Spacer
14 Box-shaped support structure
15 Fluid channel
16 Thermal exchange fluid interface
17 Outer wall
18 Environmentally sealed compartment
19 Battery stack layer

What is claimed:

1. A battery pack (1) for an electric truck comprising:
   a. a box shaped outer housing (2) comprising a base (3), a top (4) and at least one side (5) extending between the base (3) and the top (4);
   b. wherein the outer housing (2) comprises
      i. fastening means (6) to mechanically interconnect the battery pack (1) to a chassis of an electric truck;
      ii. an electrical interface (7) on an outer surface of the outer housing (2) to electrically interconnect the battery modules (10) to an electric drive train of the electric truck;
   c. a stack of battery modules (10) accommodated inside the outer housing (2) comprising at least one thermal plate (9) and several battery modules (10) arranged in thermal contact with the at least one thermal plate (9) for heating and/or cooling of the at least one battery module (9); and
   d. a box shaped support structure (14) arranged flush with an interior of the box shaped outer housing (2) and at least partially between the stack of battery modules (10) and the outer housing (2), the support structure (14) formed of plate-shaped support elements (11) comprising at least partially of a porous material and supporting the battery stack (7) with respect to the outer housing (2), and the support structure (14) including a cut-out section in one of the support elements (11) as a passage from the electrical interface (7) to the battery modules (10).

2. The battery pack (1) according to claim 1, wherein the battery modules (10) are supported with respect to each other by an inner housing (12).

3. The battery pack (1) according to claim 2, wherein the at least one thermal plate (9) forms part of the inner housing (12).

4. The battery pack (1) according to claim 1, wherein at least two thermal plates (9) are arranged parallel to each other and are mechanically interconnected to each other by at least one spacer (13).

5. The battery pack (1) according to claim 2, wherein the stack of battery modules (10) is supported with respect to the outer housing (2) by the inner housing (12) and the support elements (11).

6. The battery pack (1) according to claim 1, wherein the fastening means (6) comprise a quick release coupling.

7. The battery pack (1) according to claim 1, wherein the fastening means (6) comprise a horn-shaped hanger (6).

8. The battery pack (1) according to claim 1, wherein the porous material of the at least one support element (11) has a lower thermal conductivity then the material of the at least one thermal plate (9) and/or the material of the outer housing (2).

9. The battery pack (1) according to claim 1, wherein the support element (11) is at least partially made from foam.

10. The battery pack (1) according to claim 9, wherein the support element (11) comprises a shock absorbing and/or vibration damping layer.

11. The battery (1) according to claim 1, wherein the at least one thermal plate (9) comprises at least one fluid channel (14) for a thermal exchange fluid to flow through, said fluid channel being interconnected to a thermal exchange fluid interface (15) accessible from the outside of the outer housing (2).

12. The battery pack (1) according to claim 11, wherein the thermal exchange fluid interface (16) is arranged in an outer wall (16) of the outer housing (2).

13. The battery pack (1) according to claim 11, wherein the thermal exchange fluid interface (16) is arranged adjacent to the electric interface (18).

14. The battery pack (1) according to claim 11, wherein the thermal exchange fluid interface (16) and the electric interface (18) are with respect to a driving direction of the electric truck arranged at a leading face of the outer housing (2).

15. The battery pack (1) according to claim 1, wherein the outer housing (2) forms an environmentally sealed compartment (18).

16. The battery pack (1) according to claim 1, wherein the battery modules (10) and the at least one thermal plate (9) of the stack of battery modules (10) are stacked vertically upward forming at least one battery stack layer (19).

17. An electric truck comprising fastening means to mechanically interconnect the battery pack (1) according to claim 1 to the chassis of an electric truck.

18. The electric truck according to claim 17, wherein the fastening means are arranged at two cantilevers arranged at the chassis of the electric truck spaced a distance apart from each other suitable to receive the batter pack (1) there between.

19. The electric truck according to claim 17, wherein the electrical truck comprises an electrical interface to electrically interconnect the battery pack (1) to an electric drive train of the electric truck.

* * * * *